Aug. 6, 1957 V. P. MATHIS ET AL 2,802,117

SEMI-CONDUCTOR NETWORK

Filed May 27, 1954

INVENTORS:
VERNON P. MATHIS,
JEROME J. SURAN,
BY George V. Eltgroth
THEIR ATTORNEY.

2,802,117

SEMI-CONDUCTOR NETWORK

Vernon P. Mathis and Jerome J. Suran, Syracuse, N. Y., assignors to General Electric Company, a corporation of New York Application May 27, 1954, Serial No. 432,816

1 Claim. (Cl. 307—88.5)

This invention relates to the utilization of semi-conducting devices, and more particularly to a semi-conductor utilization circuit having improved characteristics.

There has heretofore been described by Lesk U. S. patent application, Serial No. 341,164, now Patent No. 2,769,826, and Engel U. S. patent application, Serial No. 373,828 a three-terminal semi-conducting device with a single rectifying junction disposed intermediately of spaced bilaterally conductive electrodes. Lesk, Engel, and also Mathis in U. S. patent application, Serial No. 341,011, have also illustrated various work circuits utilizing the properties of this three-terminal device. We have found that it is possible to improve the stability and response uniformity of the previously-described circuits, and of the circuits described in our co-pending application filed of even date herewith identified as 4D-95,116, through the use of certain principles and circuitry discussed in detail hereinafter.

It is a primary object of this invention to provide a new and improved semi-conductor circuit network.

It is another object of this invention to improve the uniformity of response of a semi-conductor network to input signals of varying characteristics.

Still another object of the invention is to provide a new and novel network for improving the definition of states in a multiply-stable semi-conductor network.

Yet another object of the invention is to reduce variations in reset pulse requirements of a trigger or bistable semi-conductor network.

For additional objects and advantages, and for a better understanding of the invention, reference is now made to the following description and accompanying drawings which will make apparent the essence of the invention in several representative examples of its application. Like reference characters identify like parts in the several figures. The novel features of the invention are more particularly pointed out in the appended claims.

In the drawings, Figure 1 is a schematic diagram illustrating a mode of connection of a three-terminal semi-conductor device with a single rectifying junction.

Figures 1, 2, 3, 4, 5, 6, 7:
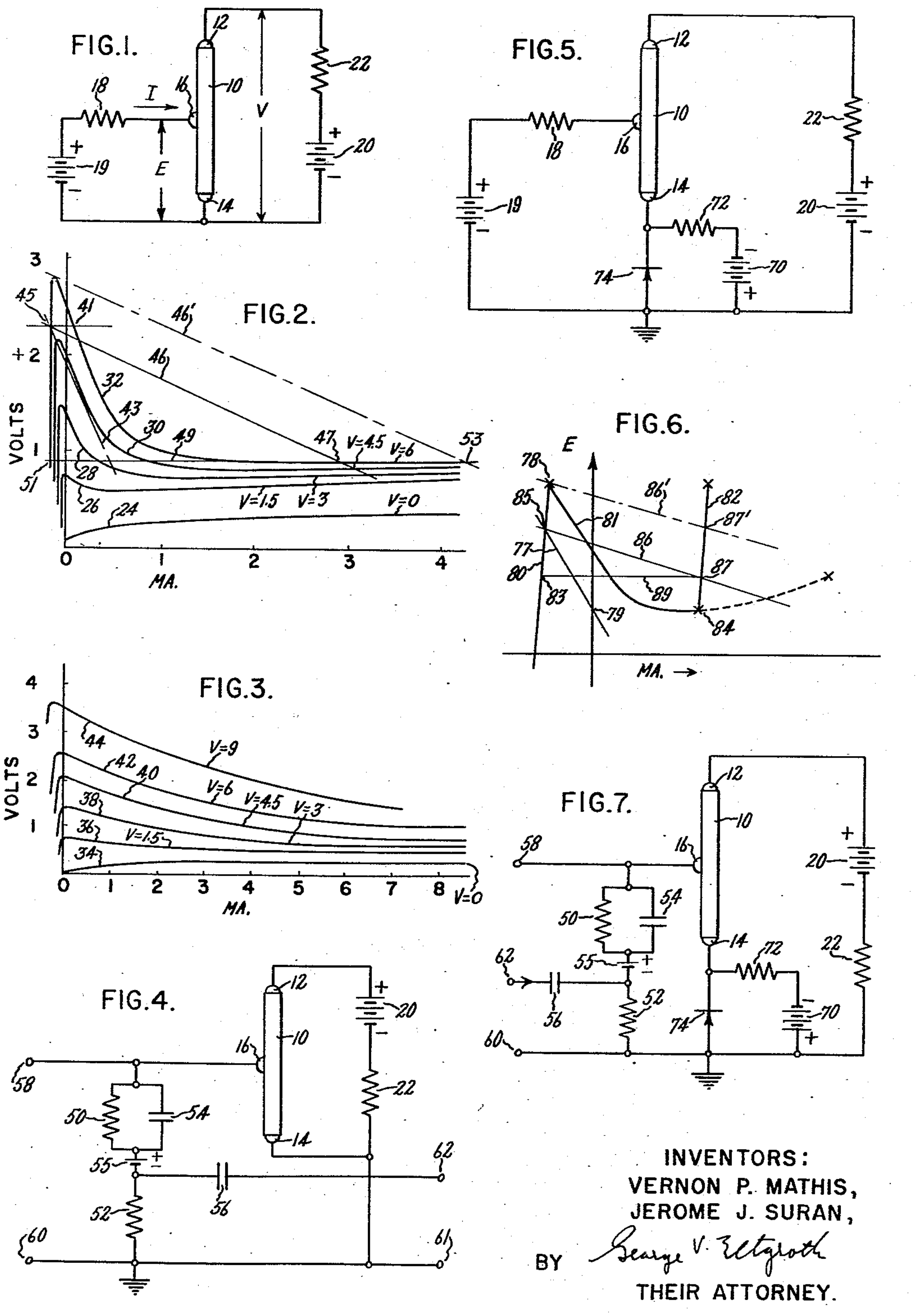
Figure 2 is a curve family illustrating the current-voltage characteristics of a p-n semi-conductor connected according to Figure 1.
Figure 3 is a curve family illustrating the current-voltage relationships observed in an n-p semi-conductor device in the circuit of Figure 1.
Figure 4 illustrates schematically a circuit utilizing such a three-terminal semi-conductor device as a triggered monostable network having pulse regenerative properties.
Figure 5 illustrates schematically the application of a stabilizing network to the three-terminal device of Figure 1.
Figure 6 is a graphic portrayal of the current-voltage relationship observed in the circuit of Figure 5.
Figure 7 illustrates schematically a triggered monostable semi-conductor network having pulse regenerative properties with improved definition and stabilization of its output characteristics.

Referring now to Figure 1 of the drawings, there is seen a semi-conductor member 10, which may be of rod or bar-like form. It may be assumed that the bar 10 is of N type germanium; that is the bar 10 is made up of germanium with an admixture of a donor impurity, such as phosphorus, arsenic, or antimony. Electrodes 12 and 14 are affixed to the respective ends of the bar 10. The electrodes 12 and 14 conduct current to and from the bar 10 without introducing appreciable rectifying properties, that is, they are predominantly bilateral in their conductive properties. Sprayed tin electrodes satisfactorily perform the services of affording a bilateral contact. A rectifying junction is established on the bar at 16, through the usual application of an acceptor type of impurity such as indium. For this purpose, any of the well-known techniques for diffusing the acceptor impurity into the bar may be used, in conjunction with such forming and mechanical structure as is needed to provide a reliable contact for junction 16.

A source 20, shown here as a battery providing a D. C. potential of approximately nine volts, may be connected across the bilaterally conducting electrodes 12, 14 in series with a resistor 22 of approximately 1,000 ohms. Similarly, a direct-current source represented here by a battery 19 providing a potential of the order of three volts may be connected with the junction electrode 16 through a limiting resistor 18.

The voltage applied across the electrodes 12, 14 may be referred to as the inter-base voltage, while the potential between the junction electrode 16 and the base 14 will be referred to as the junction electrode potential. Figure 2 illustrates the variation in voltage appearing between the junction electrode 16 and the base 14 as the current to the junction electrode is varied, as it may be by changing the value of resistor 18. The curve plots of Figure 2 show these current variations for a number of inter-base voltages, curve 24 showing the current-voltage characteristic with no inter-base voltage, while curves 26, 28, 30, 32 illustrate the same characteristic for the respective inter-base voltages 1.5, 3, 4.5, and 6 volts respectively. It is to be noted that with appreciable inter-base voltages, there are three possible values of current corresponding to a given voltage in a significant portion of the operating range.

Generally speaking, referring again to Figure 2, the current-voltage characteristic exhibits a positive slope in the negative current region, which continues as the magnitude of the negative current is reduced until the slope reverses, remaining negative until the current has attained an appreciable positive value, when the slope once again becomes positive. For identification, the regions may be designated in the following manner: the positive slope portion to the left of the voltage axis may be termed the cut-off region, while the negative slope portion beginning at the left of the voltage axis and extending to the right thereof is known as the transition region. The curved portion exhibiting a positive slope in the positive-current region is identified as the saturating region. It will be well to note at this time, for future reference, the rather small positive slope which is observed in the saturating region.

The line 46 in Figure 2 represents the variation in junction potential with change in current observed if the source 19 has a potential of about 2.2 volts and the resistance 18 has a value of approximately 2,000 ohms. The line 46′ illustrates the displacement of line 46 if the potential in the circuit giving rise to this line is augmented, as, by the addition of a positive going pulse. The significance of these lines, which may be referred to as discharge load lines, is deferred to a consideration of Figure 4, below.

The discussion so far, and the poling of the potential sources in Figure 1, have related to a p-n device. However, it is possible to use an acceptor impurity in the bar 10 and a donor impurity at the junction 16 to provide an n-p device, in which case the potentials of the sources 19 and 20 may be reversed and, after suitable adjustment of the reference axis, the current-voltage curves of Figure 3 obtained, in which the curves 34, 36, 38, 40, 42, and 44, respectively, indicate the variation in junction voltage observed at various junction currents for the respective inter-base voltages of 0, 1.5, 3, 4.5, 6, and 9. It will be noted that the curves in Figure 3 also display a positive slope in the cut-off region, a negative slope in the transition region, and a very low value of positive slope in the saturating region.

If a load line for bistable operation of the network of Figure 1 with six volts inter-base voltage be applied to Figure 2, as at 46, it will be seen that the load 46 intersects the curve 32 at a rather small, acute angle, resulting in a rather diffused definition of the voltage level characterizing this state.

A monostable circuit for regenerating pulses and responsive to trigger stimuli has been developed and described in our co-pending application, 4D-95,116. The schematic diagram for this circuit is reproduced at Figure 4 and includes the semi-conductor device comprising the germanium bar 10 with bilaterally conductive electrodes 12 and 14 at either end thereof excited from the battery 20 connected in series with the resistor 22. The junction electrode 16 is linked to the base electrode 14 through series resistors 50, 52. A battery 55 may be inserted at any point in this series circuit to permit adjustment of the operating point on the characteristic curves. However, the need for the battery may be eliminated by suitable choice of values for the resistors 50 and 52, as will be apparent. A capacitor 54 is connected in shunt with the resistor 50. The desired signal is derived from the output terminals 58, 60 while the initiating trigger is applied to the input terminals 61, 62. The terminal 62 is connected with the junction of resistors 50, 52 through capacitor 56.

In practice, a potential of nine volts has been found satisfactory for the source 20, with a resistance of 1,000 ohms for the resistor 22. The resistor 50 may be about 3,900 ohms, while the resistor 52 is of the order of 500 ohms. The capacitor 54 shunting resistor 50 may have a capacity of .01 microfarads, while the trigger input capacitor 56 may be about two microfarads. The resistor 52 is chosen in conjunction with a potential of two volts for the source 55 to provide an operating load line 46 in Figure 2 intersecting the semi-conductor characteristic in the saturating region. In the ideal circuit, the resistance 52 should be as low as possible consistent with reliable triggering, and the conductance presented by the resistor 50 must be less than the net negative conductance presented between the junction electrode 16 and the junction nearest end of resistor 52. The choice of a 2,000 ohm slope for the discharge load line 46 was made to provide a conveniently dimensioned characteristic display.

It is clear from inspection of the load line 46 in Figure 2 that the potential between terminals 58, 60 will normally rest at 2.2 on the curve 32. With the application of a positive-going impulse of proper amplitude to the input terminal 62, the operating point is momentarily shifted above the curve 32 at least as far as the discharge line 46′ and a positive current flow is established through the junction 16, the positive flow of current continues after the removal of the triggering impulse reaching an amplitude corresponding to the intersection point 47 of load line 46 and curve 32. This discharges the capacitor 54 to the potential represented by the intersection 47 of the load line 46 with the curve 32. At this point, the junction no longer accepts current from the capacitor 54, and the current flow reverses along the line 49 to its intersection at 51 with the curve 32. The capacitor 54 is now charged through the back resistance of the junction 16, whence the operating point moves along the curve 32 from the intersection 51 to the intercept 45 of the cut-off slope of curve 32, thus returning to the quiescent operating point 45. After the quiescent operating point 45 has been reached, the circuit is once again ready to respond to the trigger pulse at 62. In practice the shape and amplitude of the triggering impulse vary considerably and the peak capacitor discharge current may have any value between the intersection 47 of the load line 46 with the curve 32 and the intersection 53 of the load line 46′ and the curve 32. This latter intersection 53 represents on the illustrative figure a 33 percent increase in the peak capacitor discharge current observed if the triggering pulse has appreciable duration, and proportionately greater increases are observed as the trigger pulse amplitude is increased beyond its critical value. Therefore, trigger pulse variations are reflected in corresponding variations in the capacitor discharge circuit and the pulse appearing across the output terminals 58, 62 is dependent upon the nature of the triggering signal.

It will be noted that the relatively small acute angle included between the load line 46 and the characteristic curve 32 in Figure 2 is unfavorable to the precise definition of a limit of the excursion potential at capacitor 54. We have found a way of increasing this definition and thereby enhancing the stability and repeatability of circuit operation in the presence of varying environmental factors.

The way in which this additional stability may be provided will best be understood in conjunction with a consideration of the schematic diagram of Figure 5 where there is once more presented the semiconducting device comprising the extended semiconducting body 10 provided with bilaterally-conducting electrodes 12 and 14 at either end thereof. The resistor 22 has one terminal thereof connected with the electrode 12, as before, and the other terminal of resistor 22 is connected with the positive pole of the source 20. The negative terminal of the source 20 is connected with the anode of unilateral conductor 74, whose cathode is in turn linked with the bilaterally-conducting electrode 14 attached to the semiconductor bar 10. It will be noted that the connection of the unilateral conductor 74 is such that it is poled to present its back or high resistance to potentials applied from the source 20.

A battery 19 and a resistor 18 with the indicated polarity are connected between the junction electrode 16 and the anode electrode of the unilateral conductor 74. The source 19 is so poled as to tend to make the junction electrode 16 positive with respect to the electrode 14, which is also in opposition to the polarity required for minimum impedance to current flow in the unilateral conductor 74. The direct current source 70 and resistor 72 are connected in series and shunted across the unilateral conductor 74. It will be noted that the poling of the source 70 is such as to pass current through the unilateral conductor 74 in its direction of minimum impedance. The magnitude of the resistor 72 is so selected that this current flow equals the sum of the current flows in the respective branch circuits which excite the semi-conductor device 10 under conditions producing a current flow corresponding to the desired maximum excursion of current in the semi-conducting device. In a particular instance, a potential of 45 volts was employed in the source 70, with a resistance of 5,000 ohms for resistance 72. For reasons which will become apparent, a particularly favorable relationship exists when the resistance 72 is chosen to be a value giving a current-voltage slope approximately equal to the current-voltage slope exhibited at the junction 16 in the cut-off region of operation.

The operation of the circuit schematically illustrated at Figure 5 will best be understood in conjunction with the characteristic shown in Figure 6, which illustrates the current-voltage characteristic of the three-terminal semiconductor under discussion in somewhat idealized form.

The curve section 80 represents the variation of voltage with current observed in the cut-off region, while the curve section 81 embraces all of the transition region and may, as here, extend to and include a portion of the saturating region. These portions of the operating characteristic are substantially unchanged from those which have been described and discussed in connection with Figure 2. At the point 84 on the curve 81, however, the current flow at the electrode 14 becomes equal to the current flow in the circuit including the potential source 70 and the resistor 72. A further increase in current flow to electrode 14 must flow primarily through the resistor 72, because of the high back resistance presented by unilateral conductor 74 when an attempt is made to force current through it in the reverse direction. Accordingly, the voltage at the junction electrode rises sharply, along the curve section 82, with any further increase in the current to said junction electrode. The slope of the curve section 82 is primarily controlled by the magnitude of the resistance 72. The advantages of the operating characteristic of Figure 6 will best be understood in conjunction with a discussion of the operation of Figure 7, representing an arrangement of parts similar to that of Figure 4, modified by the insertion of the unilateral diode and associated circuits described in conjunction with Figure 5.

Returning now to Figure 7, there is once more shown the semi-conductor bar 10 provided with bilaterally conducting electrodes 12 and 14 thereof and having a junction electrode at 16 located on the bar 10 at a point within the gradient developed by a potential between electrodes 12 and 14. The source 20 has its positive pole connected with electrode 12, while its negative pole is connected through the resistance 22 with the anode of unilateral conductor 74. The cathode of the unilateral conductor 74 is connected with the electrode 14, and a series circuit comprising source 70 and resistance 72 is shunted across the unilateral diode 74 to pass current therethrough in its forward direction. As noted in connection with Figure 5, the magnitude of this current is selected to be equal to the current flowing at the electrode 14 with a predetermined level of current flowing into the junction electrode 16.

The resistors 50, 52 are connected in series between the junction electrode 16 and the anode of unilateral conductor 74. A suitable biasing battery 55 may be inserted between the resistors 50, 52, and the resistance 50 is shunted by capacitor 54. An isolation capacitor 56 connected between input terminal 62 and the ungrounded terminal of resistance 52 provides a means of inserting triggering impulses. The output signal is derived from terminals 58, 60, respectively connected with the junction electrode 16 and the anode of unilateral conductor 74.

The operating point and excursion reference lines in Figure 6 have been developed in conjunction with the parameters of Figure 7. The potential of the source 55 is represented by the point 79 on the ordinate or voltage axis. The charging load line 77 is constructed with its slope equal to the sum of the resistances 50, 52 and its intersection with the cut-off portion of the characteristic, represented by curve section 80, determines the quiescent operating point of the circuit. The discharge load line 86 is constructed to pass through the intersection 85 and has a slope corresponding to the value of resistance 52. Its intersection at 87 with the curve portion 82 defines the limit of excursion of the current through the junction electrode 16. The operating line 89 runs from the intersection 87, parallel to the abscissa, to a point of intersection 83 with the cut-off of the characteristic 80.

Application of a positive-going trigger impulse to the input terminal 62 of Figure 7 effects a displacement of the discharge load line 86 along the ordinate axis to a point above the peak at 78 and the current flow to the junction electrode increases immediately, by virtue of the negative resistance appearing at the junction electrode 16, along the line 86' representing the temporarily displaced discharge load line. With the removal of the triggering impulse, the current flow drops to the value corresponding to the intersection 87 of line 86 and curve 82. When the capacitor 54 is discharged sufficiently to reduce its potential so that the junction electrode 16 is in equilibrium with the potential in the bar 10, the current flow through the junction 16 reverses along the line 89 until it reaches a negative value corresponding to the intersection 83 and the potential in the junction electrode circuit then increases along the line 80 until the stable rest point 85 is reached. It is now particularly to be noted that the change in current observed in the presence of a trigger impulse is substantially constant, despite the instantaneous displacement of the discharge characteristic 86 to its position 86', rendering the operation in the discharge portion of the cycle essentially independent of the magnitude of the triggering impulse, in contrast to the very considerable degree of variation in the capacitor current increment resulting when the load line 46 of Figure 2 is shifted to its position 46'. In practice, it has been found that a 30 db change in the magnitude of the triggering impulse at 62 produced changes of only ten percent in the magnitude of the output pulse at 58 when the stabilizing effect of the circuits shown in Figure 5 was applied as in Figure 7.

While particular values have been assigned to the various potential sources and impedance elements, it will be understood that these are representative of a single exemplary embodiment only and that they may be significantly varied to meet changing environmental requirements without departing from the essence of the invention. As an example, the source 55 in Figures 4 and 7 may be completely eliminated so long as the charging load line intercept is readjusted to lie above the minimum voltage occurring in the first quadrant of the graphs of the element operating characteristics. In addition, it is sufficient that the resistance 50 be greater than the combined negative resistance displayed by the combination of resistance 52 and the input characteristic at the junction 16.

It will of course be understood that other modifications may be made, as required by the circumstances, without departing from the principles of the invention. The appended claim is therefore intended to cover any such modifications within the true scope and spirit of the invention.

What is claimed as new to be secured by Letters Patent of the United States is:

In combination a semiconductor device having first and second spaced predominantly bilaterally conductive electrodes operatively associated therewith and a predominantly unilaterally conductive junction electrode disposed therebetween, a predominantly unilateral conductor having two electrodes, means connecting one electrode of said unilateral conductor with said first bilaterally conductive electrode, a first source of electric potential connected in series with a first impedance from the other electrode of said unilateral conductor to said second bilaterally conductive electrode whereby a current of first sense passes through said unilateral conductor, a second source of electric potential connected in series with first and second resistances between said junction electrode and said other electrode of said unilateral conductor, said second potential being less than said first potential biasing said device to exhibit an input current-voltage characteristic exhibiting a sharply rising positive slope in a negative current or cut-off region which reverses to exhibit a negative slope in a transition region to a valley point in a positive current region and then exhibits a slowly rising positive characteristic in a saturating region, a capacitor shunting said first resistance, means for applying a signal potential across at least said second resistance, and a third source of potential connected in series with a third resistance substantially equal to the resistance presented between said junction electrode and said one of said bilaterally conductive electrodes in said cut-off region across said unilateral conductor in a sense for passing current therethrough opposing said first sense, said third source of potential being greater than said first source.

References Cited in the file of this patent

UNITED STATES PATENTS

| | | |
|---|---|---|
| 2,502,479 | Pearson et al. | Apr. 4, 1950 |
| 2,579,336 | Rack | Dec. 18, 1951 |
| 2,769,926 | Lesk | Nov. 6, 1956 |